United States Patent
Makino et al.

(10) Patent No.: US 10,355,574 B2
(45) Date of Patent: Jul. 16, 2019

(54) LINEAR MOTOR AND LINEAR MOTOR MANUFACTURING METHOD

(71) Applicant: KABUSHIKI KAISHA YASKAWA DENKI, Kitakyushu-shi (JP)

(72) Inventors: Shogo Makino, Kitakyushu (JP); Toru Shikayama, Kitakyushu (JP); Masanobu Kakihara, Kitakyushu (JP); Masayuki Hirayama, Kitakyushu (JP); Haruki Yahara, Kitakyushu (JP)

(*) Notice: Subject to any disclaimer, the term of this patent is extended or adjusted under 35 U.S.C. 154(b) by 370 days.

(21) Appl. No.: 15/172,367

(22) Filed: Jun. 3, 2016

(65) Prior Publication Data

US 2016/0359402 A1  Dec. 8, 2016

(30) Foreign Application Priority Data

Jun. 5, 2015 (JP) ................. 2015-115324

(51) Int. Cl.
*H02K 41/02* (2006.01)
*H02K 15/02* (2006.01)
*H02K 1/12* (2006.01)

(52) U.S. Cl.
CPC ............. *H02K 41/02* (2013.01); *H02K 15/02* (2013.01); *H02K 1/12* (2013.01)

(58) Field of Classification Search
CPC ...... H02K 41/02; H02K 41/025; H02K 41/03; H02K 41/031; H02K 1/00; H02K 1/02; H02K 1/12; H02K 1/17; H02K 1/22; B61B 13/08; B61B 13/10; B65G 54/02; B65G 45/02; B65G 21/2018; B60L 13/03; B60L 13/04; H01F 7/0205
See application file for complete search history.

(56) References Cited

U.S. PATENT DOCUMENTS

2011/0043053 A1* 2/2011 Shikayama .......... H02K 41/031
310/12.15

FOREIGN PATENT DOCUMENTS

| JP | 2-41650 A | 2/1990 |
|---|---|---|
| JP | 3-226261 A | 10/1991 |
| JP | 5-168283 A | 7/1993 |
| JP | 9-98564 A | 4/1997 |
| JP | 2002-136099 A | 5/2002 |
| JP | 2003-189514 A | 7/2003 |
| JP | 2013-046460 A | 3/2013 |
| WO | WO 2012/056841 A1 | 5/2012 |

OTHER PUBLICATIONS

Japanese Office Action dated Aug. 1, 2017 in Japanese Patent Application No. 2015-115324 (previously filed, submitting English translation only), 3 pages.

* cited by examiner

Primary Examiner — Tran N Nguyen
(74) Attorney, Agent, or Firm — Oblon, McClelland, Maier & Neustadt, L.L.P.

(57) ABSTRACT

This disclosure discloses a linear motor including a stator, a mover, and a plurality of teeth. The stator includes a stator curved part having an arc shape in a longitudinal direction. The mover is arranged facing the stator and is moved in the longitudinal direction of the stator. The plurality of teeth are arranged in parallel along the longitudinal direction so that a pitch of the teeth at an outer-peripheral side is larger than the pitch of the teeth at an inner-peripheral side on the stator curved part.

20 Claims, 16 Drawing Sheets

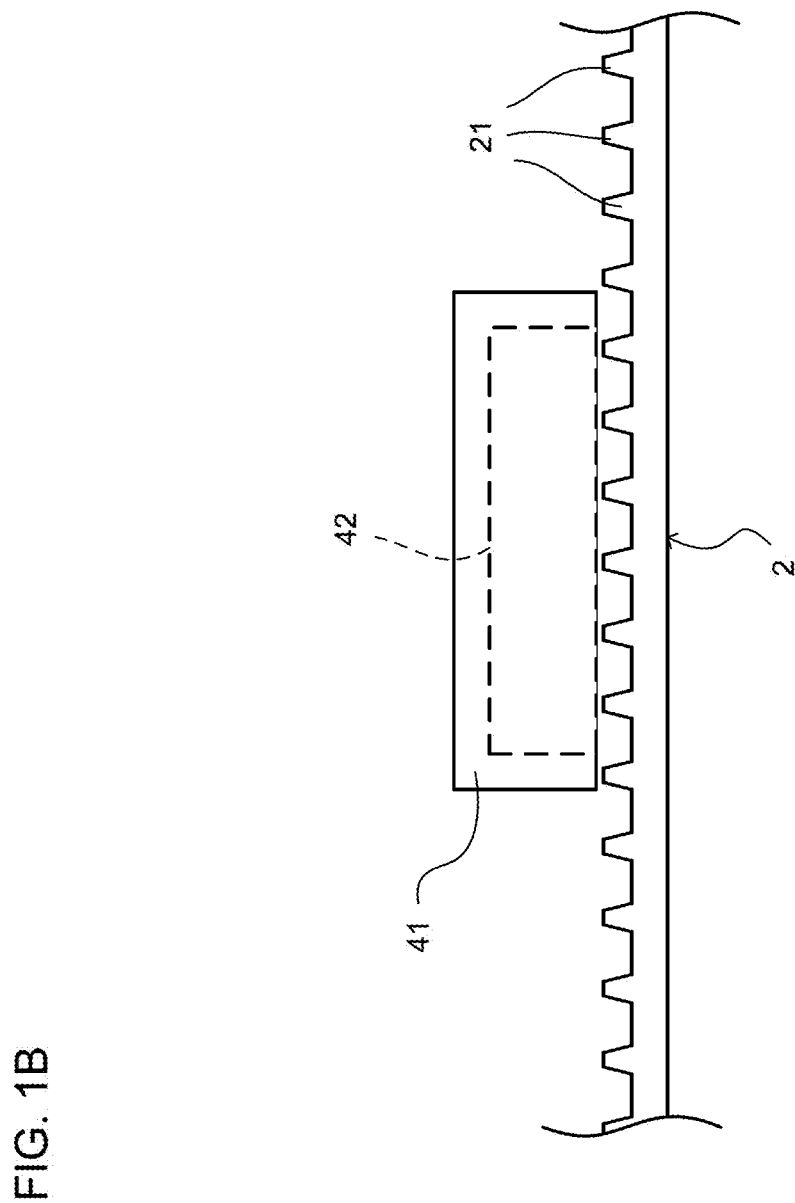

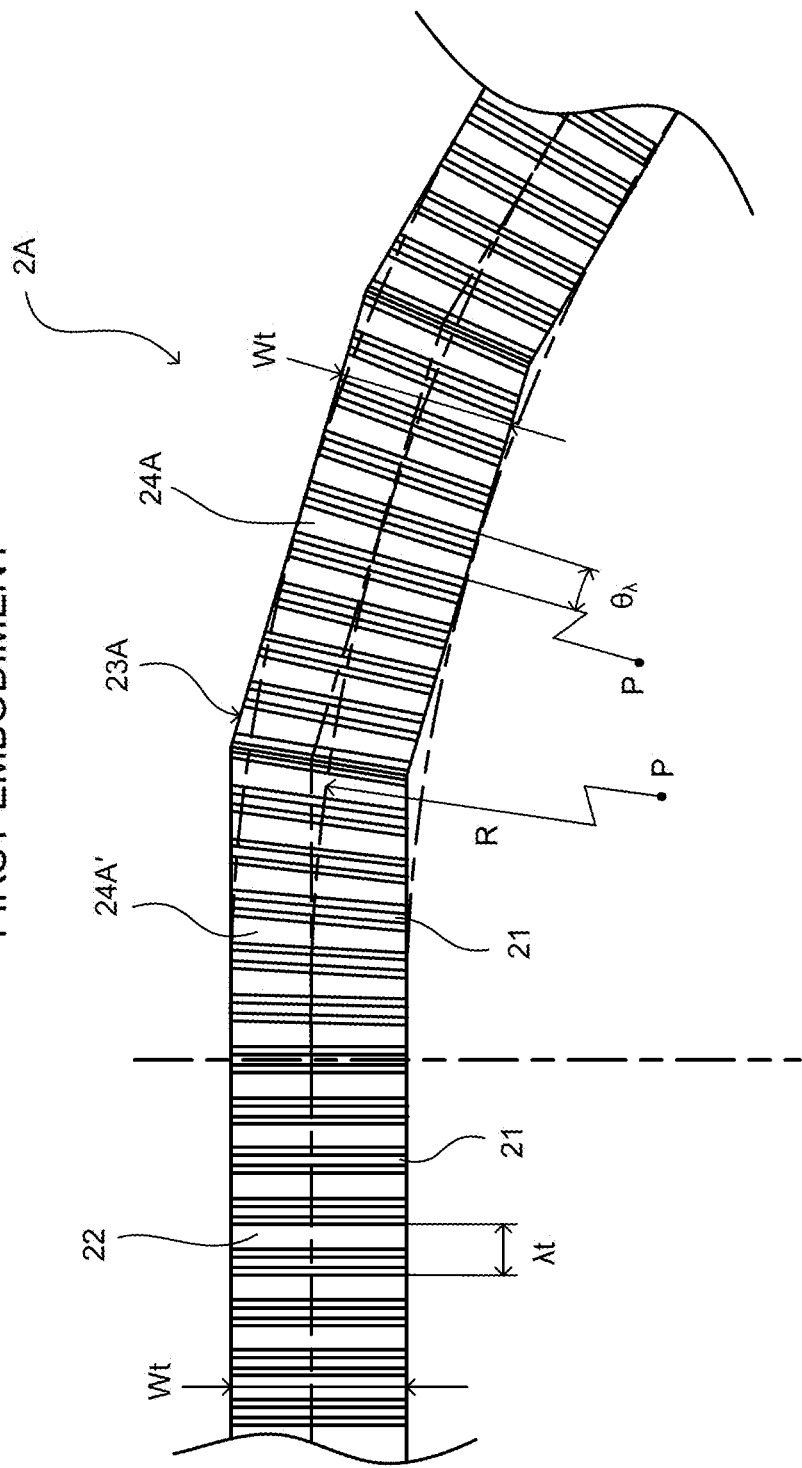

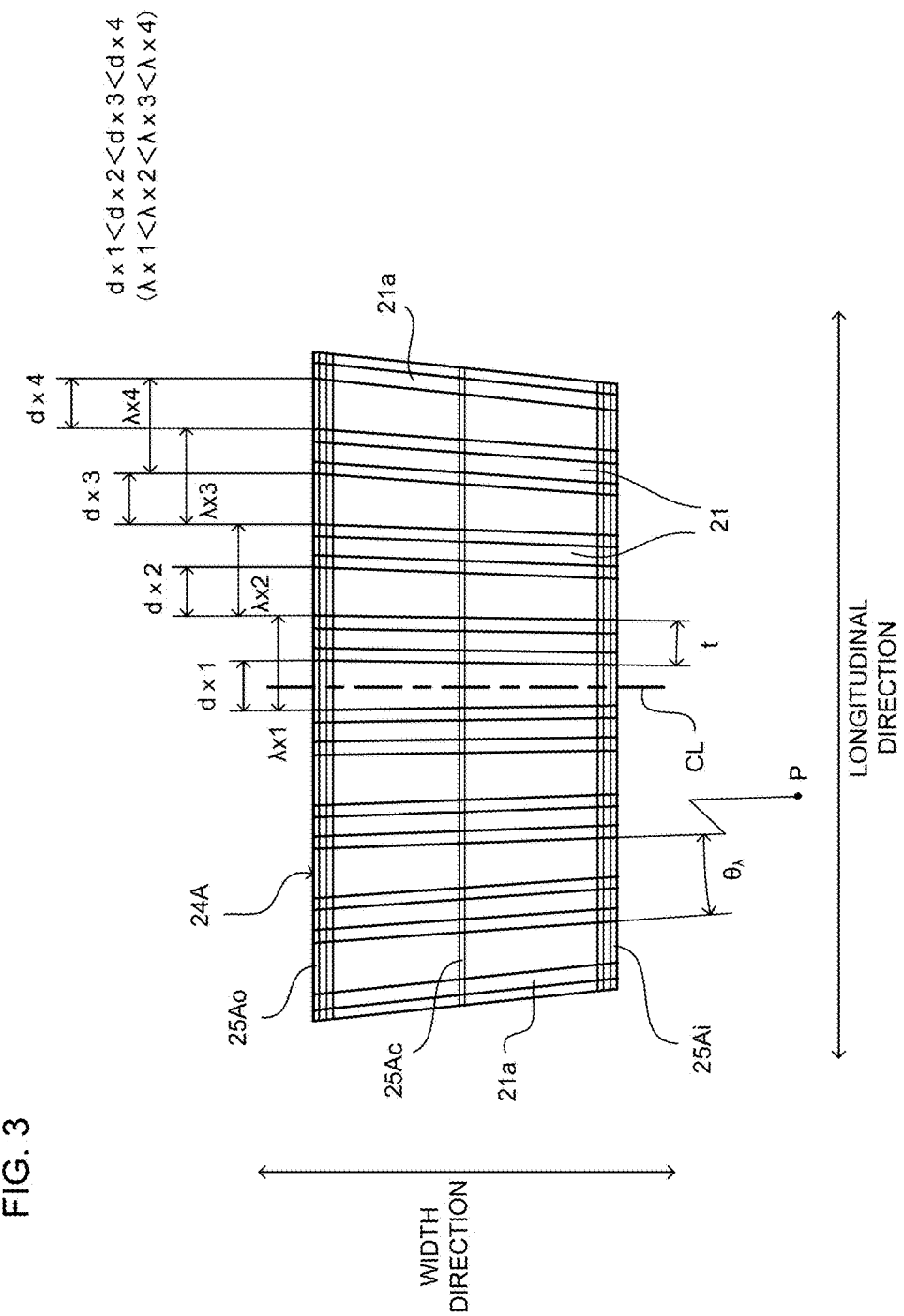

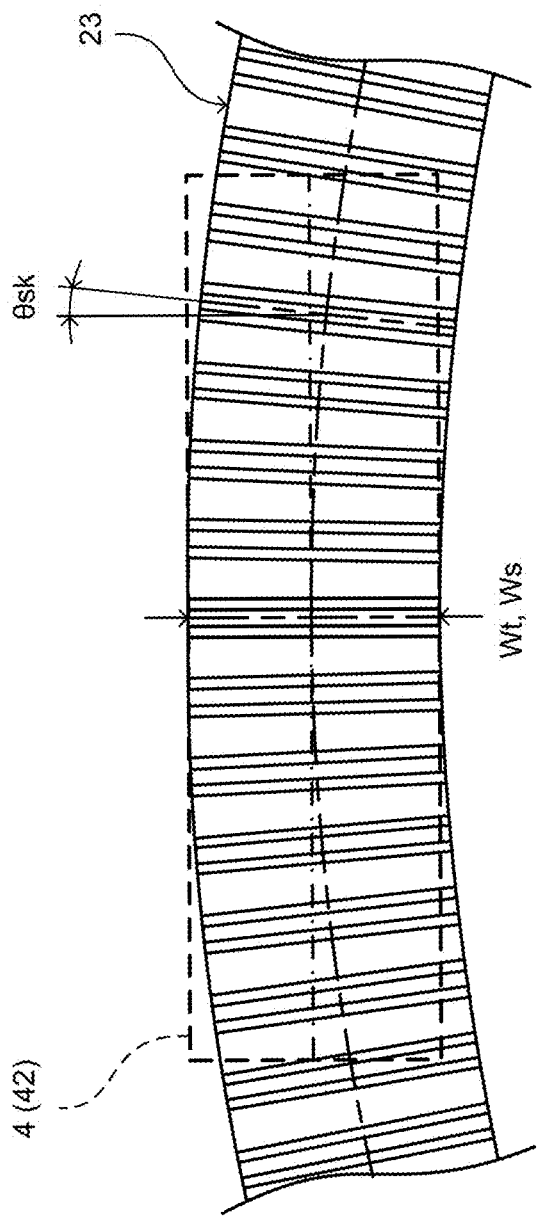

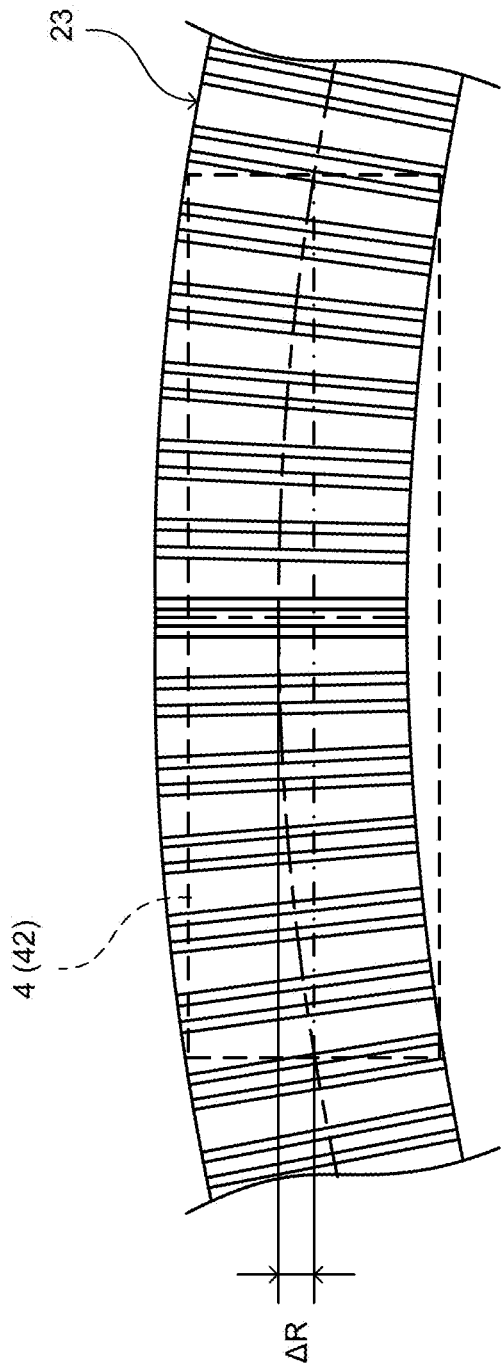
FIG. 12 FOURTH EMBODIMENT

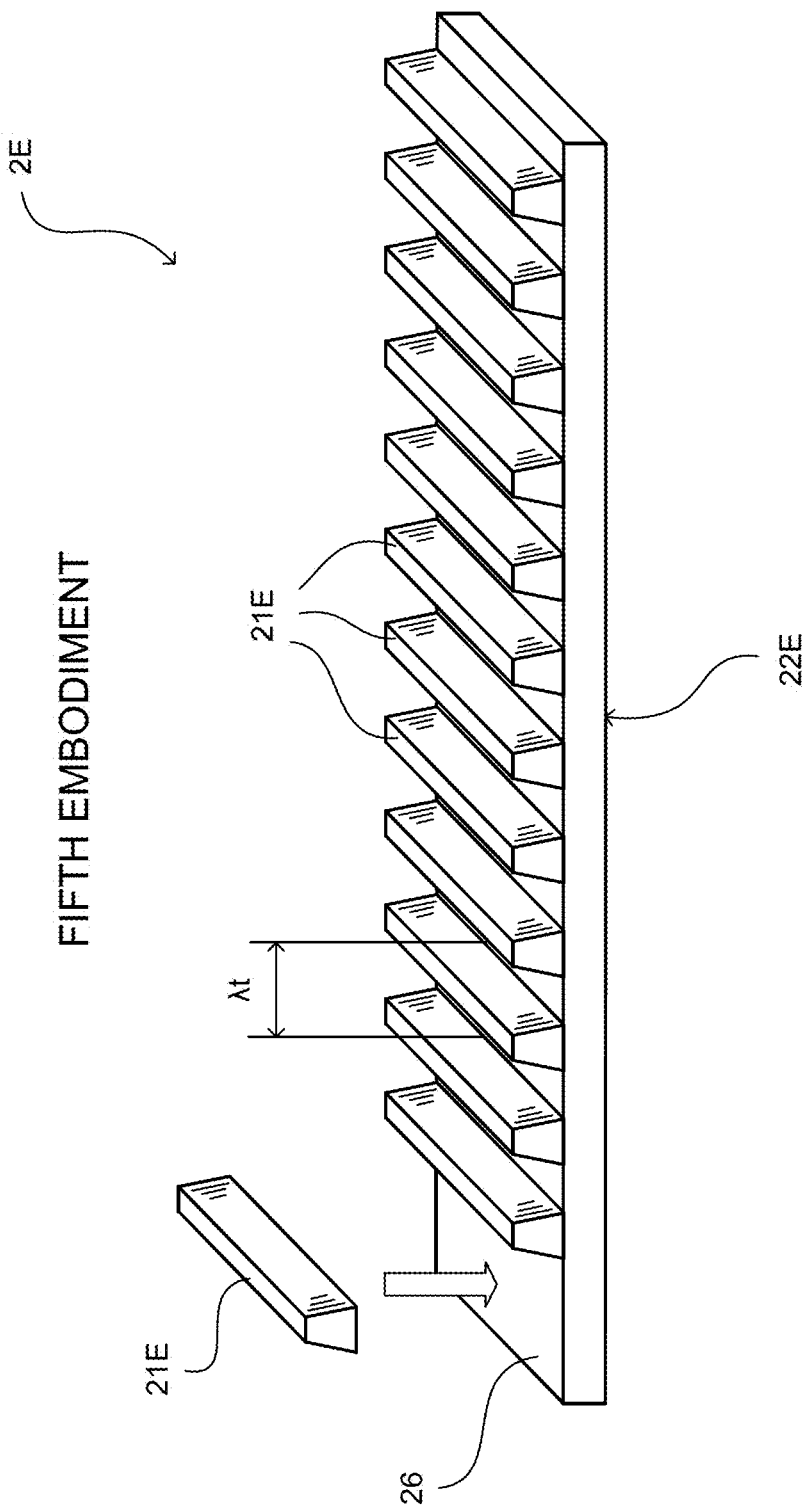

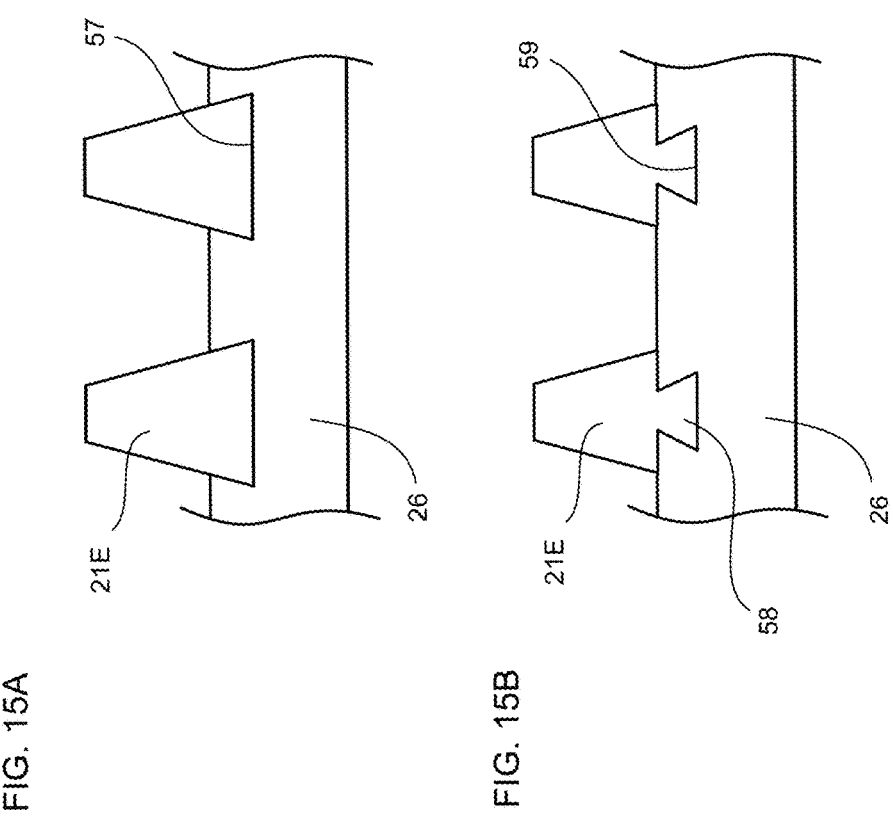

LINEAR MOTOR AND LINEAR MOTOR MANUFACTURING METHOD

CROSS-REFERENCE TO RELATED APPLICATIONS

The present application is based upon and claims the benefit of priority to Japanese Patent Application No. 2015-115324, filed Jun. 5, 2015, the entire contents of which are incorporated herein by reference.

TECHNICAL FIELD

A disclosed embodiment relates to a linear motor and a linear motor manufacturing method.

BACKGROUND

In a linear motor which generates a thrust by formation of an advancing magnetic field by an armature on a mover side with respect to a salient pole formed on a stator side to relatively move the mover with respect to the stator, a linear motor is known in which the stator that becomes a running path of the mover has a linear portion and a curved portion.

SUMMARY

According to one aspect of the disclosure, there is provided a linear motor including a stator, a mover, and a plurality of teeth. The stator includes a stator curved part having an arc shape in a longitudinal direction. The mover is arranged facing the stator and is moved in the longitudinal direction of the stator. The plurality of teeth are arranged in parallel along the longitudinal direction so that a pitch of the teeth at an outer-peripheral side is larger than the pitch of the teeth at an inner-peripheral side on the stator curved part.

BRIEF DESCRIPTION OF THE DRAWING

FIG. 1B is a side view illustrating the appearance of the entire linear motor having the basic configuration.

FIG. 2 is a plan view of an entire stator including a stator linear portion and a stator curved part in the case of a first embodiment when seen from above.

FIG. 3 is a plan view of a stator dividing linear part constituting the stator curved part in the case of the first embodiment.

FIG. 11 is a plan view of an arrangement relation between the stator curved part and a mover in the case of a comparative example with respect to a fourth embodiment when seen from above.

FIG. 12 is a plan view of the arrangement relation between the stator curved part and the mover in the case of the fourth embodiment when seen from above.

FIG. 13 is a perspective view of the stator linear portion in which a plurality of columnar teeth formed by separate bodies is arranged on a substrate part in the case of a fifth embodiment when seen from diagonally above.

FIG. 15A is a side sectional view illustrating an example of the fixing structure in the case in which only the columnar teeth are constituted by the electromagnetic steel in the fifth embodiment.

FIG. 15B is a side sectional view illustrating another example of the fixing structure in the case in which only the columnar teeth are constituted by the electromagnetic steel in the fifth embodiment.

DESCRIPTION OF THE EMBODIMENTS

Embodiments will be described below by referring to the attached drawings.

1: Schematic Configuration of Linear Motor

Figure 1A:
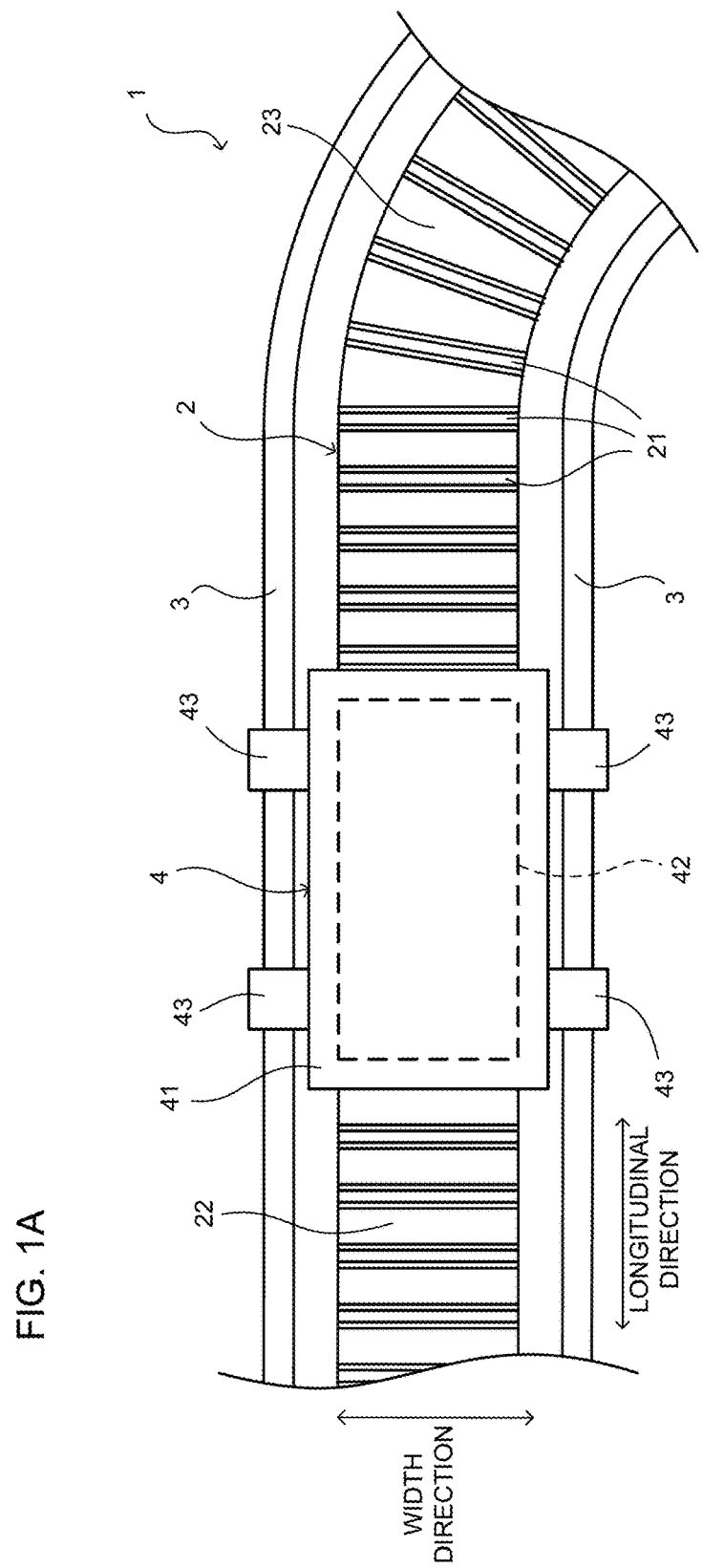
FIG. 1A is a plan view illustrating an appearance of an entire linear motor having a basic configuration.

FIGS. 1A and 1B illustrate appearance views of a linear motor of this embodiment, in which FIG. 1A is a plan view when seen from above, and FIG. 1B illustrates a side view when seen from a side. In these FIGS. 1A and 1B, the linear motor 1 of this embodiment is a linear motor operating on a principle of reluctance and has a stator 2, a guide rail 3, and a mover 4.

The stator 2 is a substantially plate-shaped member having a band shape fixedly installed on a floor surface (not particularly shown). On an upper surface of the stator 2, a plurality of teeth 21 formed so as to protrude upward, respectively, is arranged in parallel in a longitudinal direction (substantially right-and-left direction in the figure) of the stator 2. The term "parallel" here means an arrangement relation of only alignment along the longitudinal direction and does not necessarily mean that the teeth 21 are in a parallel relation with each other (the same applies to the following). The stator 2 has a stator linear portion 22 which is linear in the longitudinal direction and a stator curved part 23 which has the arc-shaped longitudinal direction. In the stator linear portion 22, each of the teeth 21 is arranged in parallel with each other. In the illustrated example, each portion of the stator 2 is integrally constituted by an electromagnetic steel, including each of the teeth 21.

Guide rails 3 (an example of an induction part) are two rails fixedly arranged substantially in parallel with the stator 2, respectively, on both sides in a width direction (substantially vertical direction in the figure) orthogonal to the longitudinal direction of the stator 2. In FIG. 1B, in order to avoid complication of the illustration, the guide rails 3 are not shown.

The mover 4 is a moving body arranged facing the upper surface of the stator 2 and capable of running in the longitudinal direction of the stator 2. The mover 4 has a housing 41 having a substantially rectangular solid shape in the illustrated example, an armature 42 disposed inside the housing 41, and four guide portions 43 disposed on side parts of the housing 41. The armature 42 generates a moving magnetic field for moving a magnetic pole row arranged intermittently along the longitudinal direction of the stator 2 in the longitudinal direction over time by supply of three-phase power from an outside through a cable or the like, not particularly shown. Since detailed configuration of the armature 42 is equal to those well-known, illustration and description are omitted. The guide portions 43 are disposed two each on front and rear of both side surfaces of the housing 41 in the width direction and are supported on the guide rails 3 on the respective corresponding sides. In FIG. 1B, the guide portions 43 are not shown in order to avoid complication of illustration.

In the linear motor 1 having the configuration described above, the mover 4 is supported on the guide rails 3 and capable of moving along the longitudinal direction of the stator 2 by being guided by the guide rails 3 while a non-contact state with a certain gap from each of the teeth 21 on the stator 2 is maintained. By means of generation of the moving magnetic field by the armature 42 of the mover 4 toward each of the teeth 21 of the stator 2, a thrust can be given to the mover 4 by an attraction force between those moving magnetic fields and each of the teeth 21 and the mover 4 can be moved. As described above, by using the reluctance-type linear motor 1 including the armature 42 on the mover 4 side and the electromagnetic steel teeth 21 on the stator 2 side, the linear motor 1 which does not cost much and is easily controllable can be realized without including a large number of permanent magnets or armature coils on the stator 2 having a long stroke.

2: Features of this Embodiment

In the linear motor 1 having the configuration described above, as a layout of the stator 2 which is a moving path of the mover 4, not only the stator linear portion 22 which is linear in the longitudinal direction but also the substantially arc-shaped stator curved part 23 are provided. However, equal functioning of the teeth 21 both on the stator linear portion 22 and the stator curved part 23 so as to make a manufacturing method as common as possible and to reduce an entire manufacturing cost are in demand.

On the other hand, in this embodiment, the plurality of teeth 21 is arranged on the stator curved part 23 such that, in teeth groups each having a predetermined number N (1≤N as an integer) of the adjacent teeth 21, an outer peripheral side pitch is larger than an inner peripheral side pitch. The teeth 21 of the stator curved part 23 constituted as above can function equally to the case of the stator linear portion 22, and many parts of the manufacturing method can be made common with those of the stator linear portion 22, whereby the entire manufacturing cost can be reduced. In the following, the embodiment of the plurality of stators 2 (and the guide rails 3) capable of realizing the aforementioned functions will be described sequentially.

3.1: Stator of First Embodiment

Figure 4:
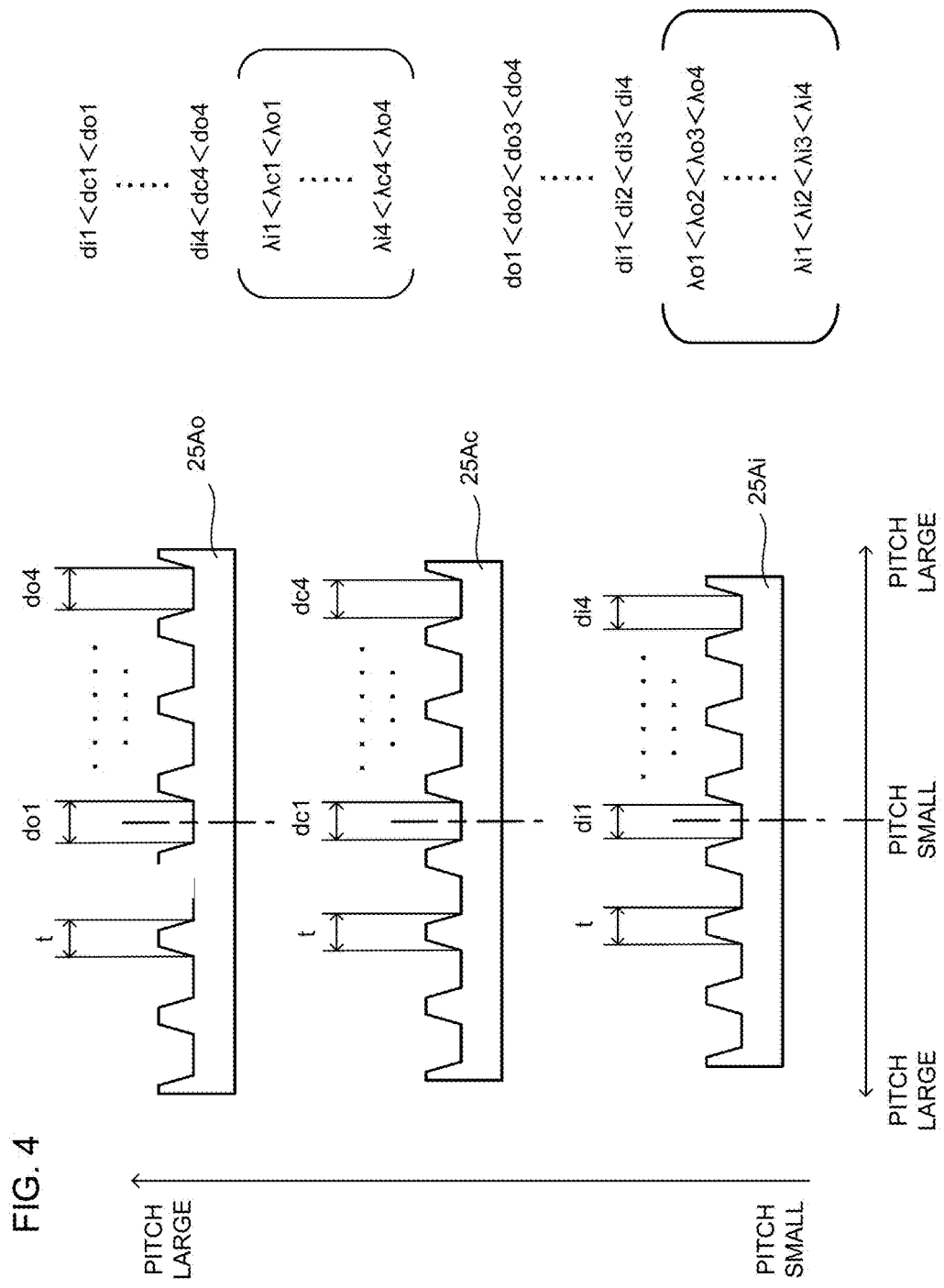
FIG. 4 is a side view of each of sheet steels constituting the stator dividing linear part in the case of the first embodiment.

FIGS. 2 to 4 illustrate configuration of a stator 2A of a first embodiment.

FIG. 2 illustrates a plan view of the entire stator 2A having the stator linear portion 22 and a stator curved part 23A when seen from above, FIG. 3 illustrates a plan view of a stator dividing linear part 24A constituting the stator curved part 23A, and FIG. 4 illustrates a side view of each sheet steel 25A constituting the stator dividing linear part 24A. First, as illustrated in FIG. 2, the stator curved part 23A included in the stator 2A of the first embodiment is constituted so that the general shape in the longitudinal direction has a substantially arc shape by connecting the plurality of stator dividing linear parts 24A each having a substantially linear shape in the longitudinal direction in a circumferential direction of the stator curved part 23A.

Each of the stator dividing linear parts 24A is formed having a generally trapezoidal shape as illustrated in FIG. 3, and the teeth 21 are arranged in parallel in the longitudinal direction of the trapezoidal shape, that is, in a direction (right-and-left direction in the figure) parallel with long sides and short sides. In this embodiment, the stator dividing linear part 24A is constituted by laminating a plurality of the sheet steels 25A (see FIG. 4 which will be described later) in the width direction orthogonal to the longitudinal direction. The stator linear portion 22 is also constituted similarly by laminating the plurality of sheet steels in the width direction. That is, the stator linear portion 22 and the stator dividing linear part 24A are produced in entirety by a common forming method of laminating the linear sheet steels 25 along the longitudinal direction, respectively, in the same number in the width direction so as to have the same width dimension Wt.

In the stator dividing linear part 24A of this embodiment, a pitch λ between the adjacent teeth 21 changes both in the longitudinal direction and in the width direction. Here, the pitch λ corresponds to a distance between corresponding two points on the adjacent two teeth 21 (that is, a waveform cycle). This pitch λ corresponds to a total of a width t of each of the teeth 21 set the same, respectively, in the longitudinal direction and a separation distance d between the adjacent teeth 21. Thus, in the stator linear portion 22, in an adjacent teeth pair of any combination or at any position in the width direction, a pitch λt becomes constant (see FIG. 2).

FIG. 4 illustrates a sheet steel 25Ao located on a side closest to the long side in the plurality of sheet steels 25A constituting the stator dividing linear part 24A on an upper part, a sheet steel 25Ac located at a center in a width direction on a center, and a sheet steel 25Ai located on a side closest to a short side on a lower part (for the position of each of the sheet steels 25A, see FIG. 3). As illustrated in FIG. 4, between the same adjacent teeth pairs, the closer to the long-side side (that is, on an outer peripheral side of the stator curved part 23A) the sheet steel 25A is located, the larger the pitch λ between the sectional shapes of the respective teeth 21 is set. That is, since a width t of each of the teeth 21 is the same, only the separation distance d becomes wider. The closer to the short-side side (that is, on an inner peripheral side of the stator curved part 23A) the sheet steel 25A is located, the smaller the pitch λ (separation distance d) between sectional shapes of the respective teeth 21 becomes.

Moreover, in this embodiment, using a center position in the longitudinal direction of the entire stator dividing linear part 24A as a reference position, the closer to this reference position, the smaller the pitch λ (separation distance d) between the adjacent teeth 21 is set, while the farther away from the reference position, the larger the pitch λ (separation distance d) between the adjacent teeth 21 is set. The entire stator dividing linear part 24A is formed symmetrically to the longitudinal direction with respect to a reference line CL corresponding to the reference position, and half bodies 21*a* of the teeth are formed on both end portions in the longitudinal direction.

By setting the appropriate pitch as above, each of the teeth 21 of the stator dividing linear part 24A is arranged substantially radially with respect to a curvature center P of the entire stator curved part 23A connecting a plurality of the stator dividing linear parts 24A (see FIG. 2). That is, in the adjacent teeth pair of any combination located on the stator curved part 23A, a pitch angle $\theta_\lambda$ to the curvature center P can be made the same. In this case, one of the individual teeth 21 (=predetermined number N) arranged on the stator curved part 23A singularly constitutes the adjacent teeth group. In the example illustrated in FIG. 2, stator dividing linear parts 24A' divided into halves at the center position in the longitudinal direction (=reference position) are connected to end portions of the stator linear portion 22. By connecting each of the stator dividing linear parts 24A so that the short sides thereof are adjacent to each other on the inner peripheral side, the entire stator curved parts 23A are constituted having a shape close to an arc shape with a radius of curvature R.

3.2: Effect of First Embodiment

As described above, according to the linear motor 1 including the stator 2A of the first embodiment, in the stator curved part 23A having an arc-shaped longitudinal direction, the plurality of teeth 21, in other words, the teeth groups each constituted by the predetermined number N (N=1 in this embodiment) of the adjacent teeth 21 is arranged so that the outer-peripheral side pitch is larger than the inner-peripheral side pitch. The teeth 21 of the stator curved part 23A constituted as above can function equally to the case of the stator linear portion 22, and by making many parts of the manufacturing method common, the entire manufacturing cost can be reduced. As a result, cost reduction and control performances can be improved.

Particularly in this embodiment, in the stator curved part 23A, the teeth 21 are arranged radially from the curvature center P of the stator curved part 23A. As a result, variation in a thrust between the teeth 21 can be reduced, and swing performances of the mover 4 in the stator curved part 23A can be improved.

Particularly in this embodiment, the stator 2 is constituted by laminating the plurality of sheet steels 25 in the width direction orthogonal to the longitudinal direction. As a result, a complicated three-dimensional shape of the electromagnetic steel of the stator 2 can be formed easily and accurately.

Particularly in this embodiment, the stator curved part 23A is constituted having a generally arc shape in the longitudinal direction by connecting the plurality of stator dividing linear parts 24A each having the linear longitudinal direction in the circumferential direction of the stator curved part 23A. As a result, by using the stator dividing linear part 24A capable of being produced by laminating the linear sheet steels 25 similarly to the stator linear portion 22, the stator curved part 23A can be constituted. That is, in the manufacturing method of laminating the linear sheet steels 25, the stator linear portion 22 and the stator curved part 23A can be made common, whereby the cost can be reduced.

Particularly in this embodiment, in each sheet steel 25 of the stator dividing linear part 24A, the farther away from the reference position in the longitudinal direction (the center position in this example) it is, the larger the pitch λ of sectional shape portions of the teeth 21 is set. As a result, in the stator dividing linear part 24A, each of the teeth 21 can be arranged more radially and thus, the variation in the thrust in the stator curved part 23A can be reduced, whereby the swing performances of the mover 4 can be improved.

4.1: Stator in Second Embodiment

Figure 5:
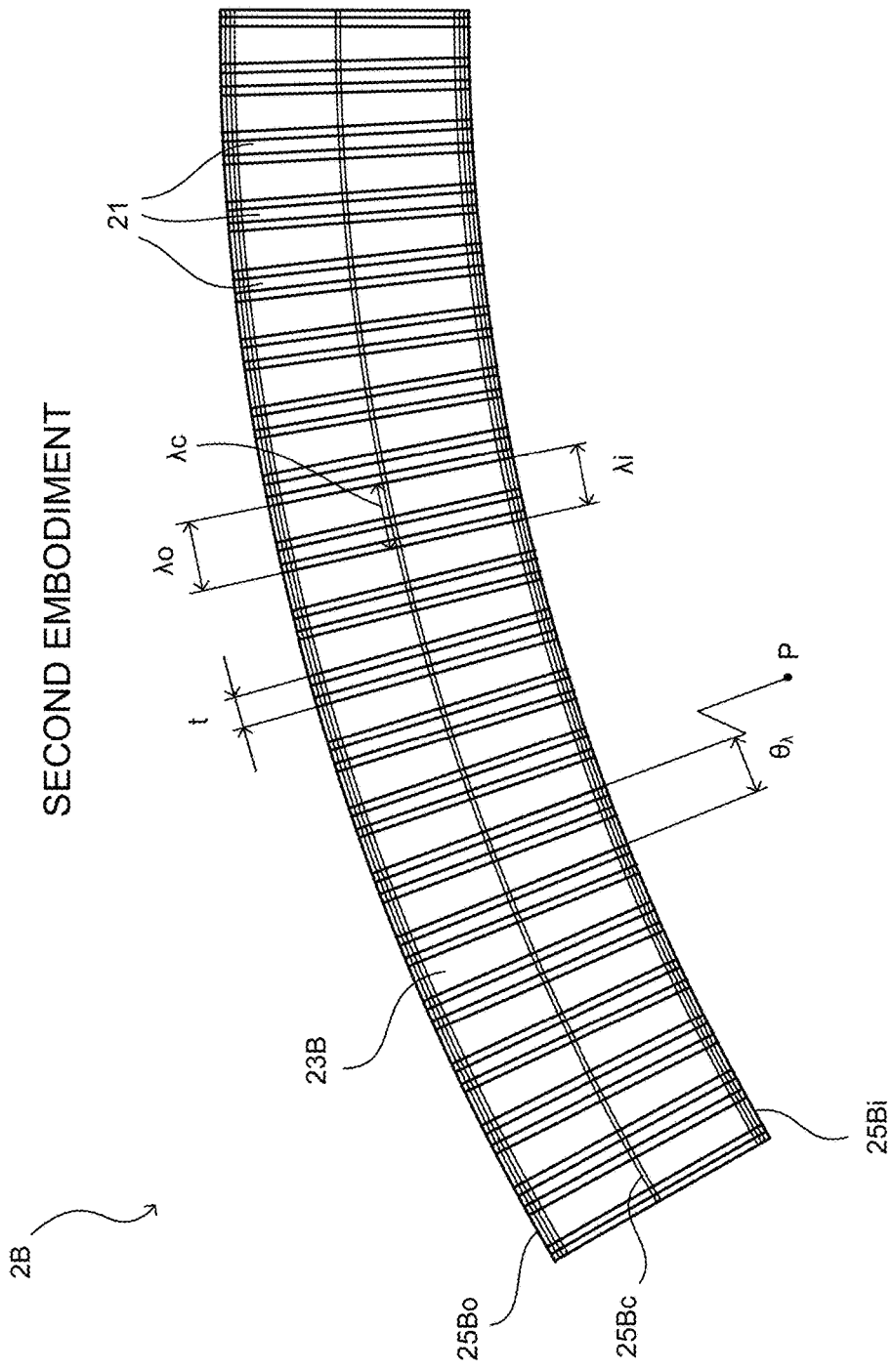
FIG. 5 is a plan view of the entire stator curved part in the case of a second embodiment when seen from above.
Figure 6:
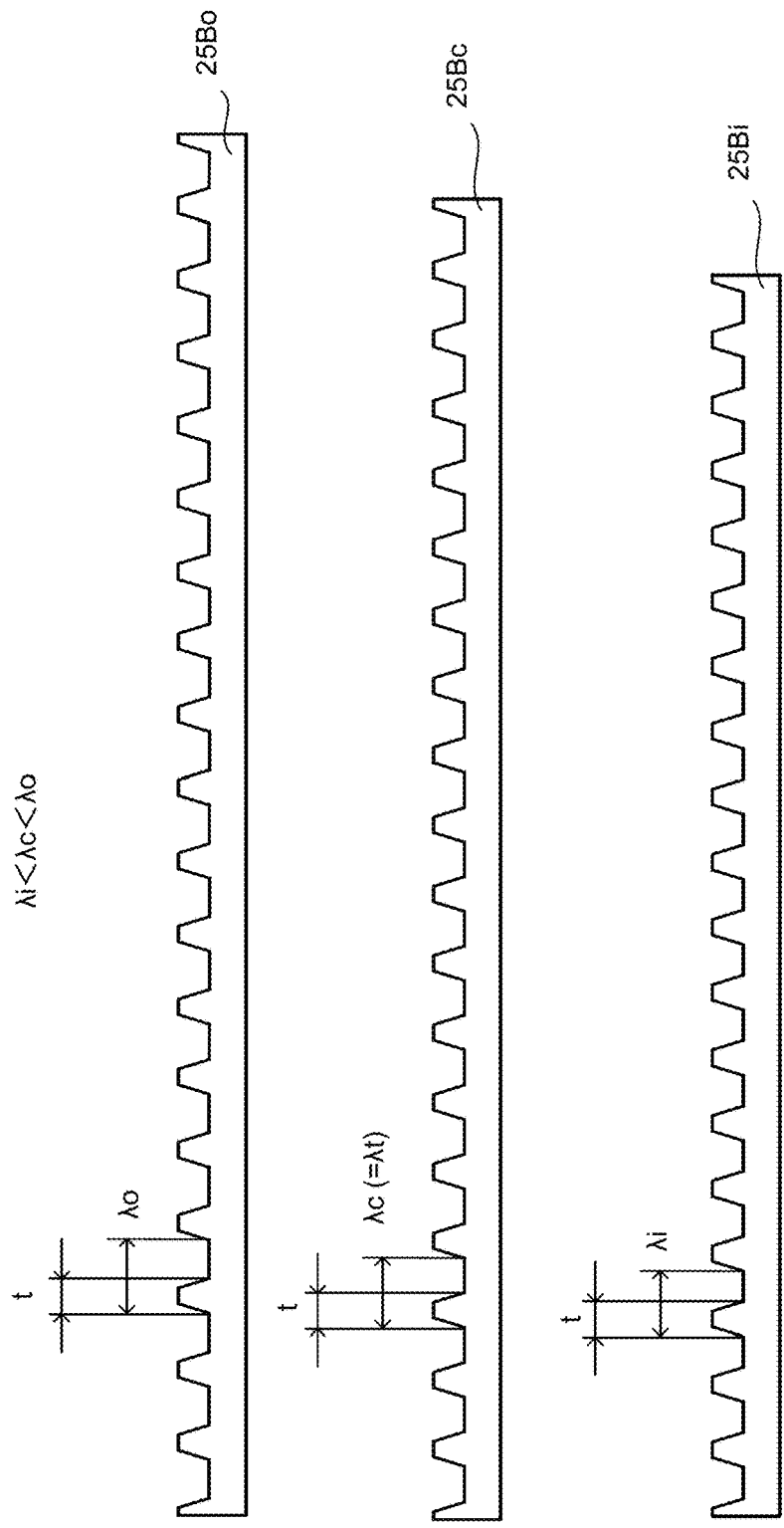
FIG. 6 is a side view of each of sheet steels constituting the stator curved part in the case of the second embodiment.
Figure 7:
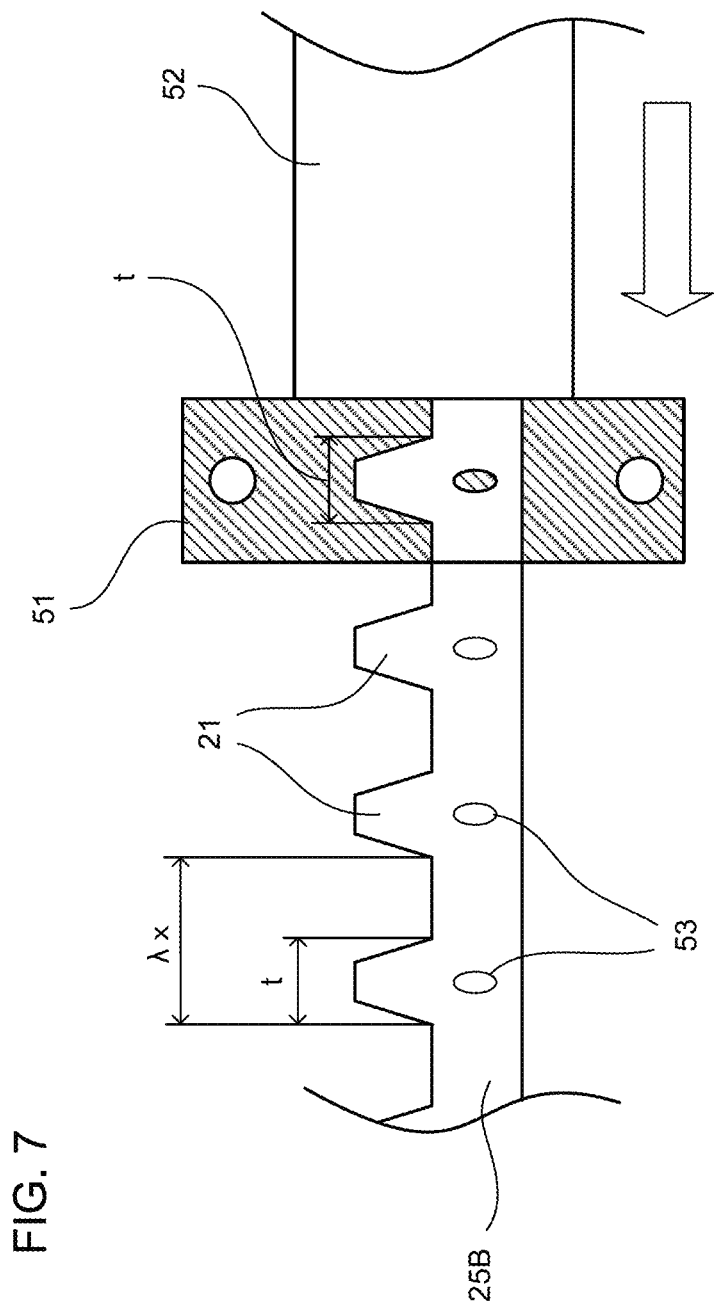
FIG. 7 is a view illustrating a production process of the sheet steel in the case of the second embodiment.
Figure 8:
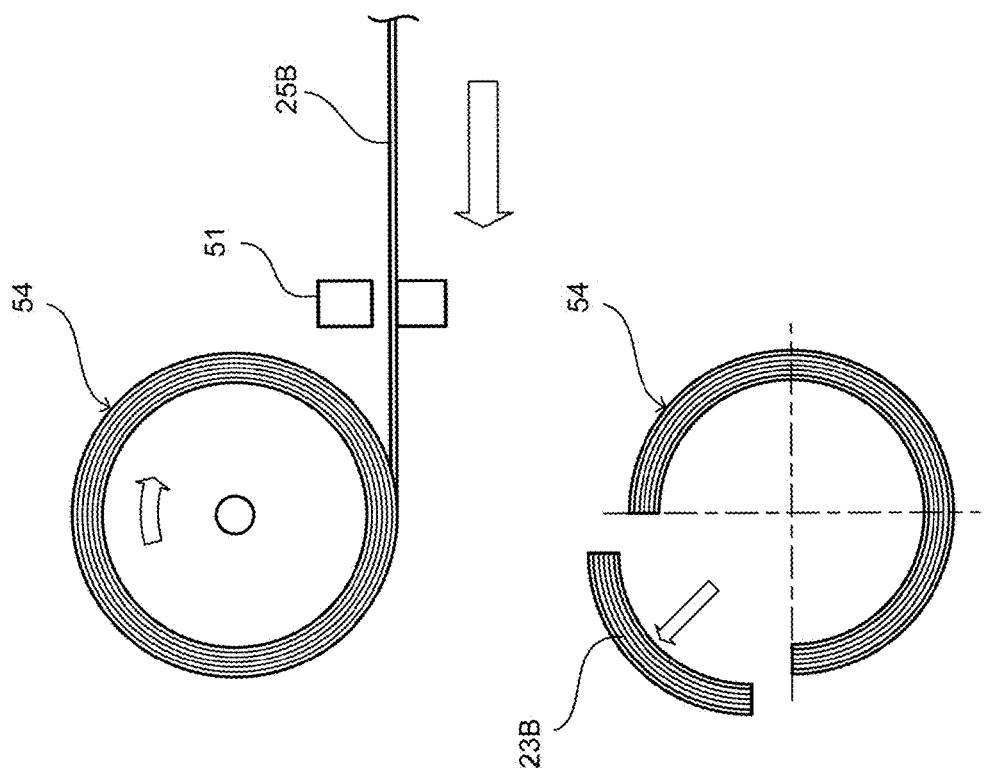
FIG. 8A is a view illustrating a method of producing the stator curved part by laminating the sheet steels in the case of the second embodiment.
FIG. 8B is a view illustrating a method of producing the stator curved part by laminating the sheet steels in the case of the second embodiment.

FIGS. 5 to 8 illustrate configuration of a stator 2B of a second embodiment. FIG. 5 illustrates a plan view of an entire stator curved part 23B when seen from above, FIG. 6 illustrates a side view of each sheet steel 25B constituting the stator curved part 23B, FIG. 7 illustrates a production process of the sheet steel 25B, and FIG. 8 illustrates a method of producing the stator curved part 23B by laminating the sheet steels 25B. First, as illustrated in FIG. 5, the stator curved part 23B included in the stator 2B of the second embodiment is constituted having a general arc shape in the longitudinal direction by laminating a plurality of the sheet steels 25B curved having an arc shape with a certain curvature.

FIG. 6 illustrates a sheet steel 25Bo located on an outermost peripheral side in the plurality of sheet steels 25B constituting the stator curved part 23B of this embodiment in an upper part, a sheet steel 25Bc located at the center in the width direction on the center, and a sheet steel 25Bi located on an innermost peripheral side in a lower part (for positions of the respective sheet steels 25B, see FIG. 5). In this FIG. 6, the sheet steel 25B at each position has the same number (19 pieces in the illustrated example and the half body each on the both ends) of the teeth 21 each having the same width t, but a circumferential length on the arc, that is, an entire length of each sheet steel 25B in the longitudinal direction is different by a difference of radial positions from the curvature center P. Thus, a pitch λc of sectional shapes of the teeth 21 on the sheet steel 25Bc located at the center in the width direction is the same as the pitch λt on the stator linear portion 22, but based on this pitch λc, the sheet steel 25B located on the outer peripheral side thereof has the larger pitch λ (separation distance d), while the sheet steel 25B located on the inner peripheral side thereof has the smaller pitch λ (separation distance d).

The sheet steel 25B as described above can be produced by punching by using a press die 51 as illustrated in FIG. 7, for example. In the illustrated example, while a sheet steel strip 52 having a sufficient width dimension is being fed in the longitudinal direction, the sheet steel 25B is formed by punching the sheet steel strip 52 by using the press die 51 capable of forming one sectional shape of the teeth 21. By changing a punching cycle of the press die 51 with respect to the feeding speed of the sheet steel strip 52 at this time, the pitch λ (separation distance d) of the teeth 21 can be changed. That is, each sheet steel constituting the stator linear portion 22 and the sheet steel 25B at any radial position illustrated in FIG. 6 can be produced in common by the same device using the press die 51.

In the example of this embodiment, when the teeth 21 are to be formed by punching the sheet steel strip 52 with the press die 51, embosses 53 for clamping are also pressed and formed on a lower part of the teeth 21. This emboss 53 facilitates alignment of the sheet steels 25B to be laminated in the longitudinal direction and improves fixation between the sheet steels 25B.

The sheet steel 25B in which the sectional shapes of the teeth 21 are formed by punching with the press die 51 is wound in a roll state as illustrated in FIG. 8A, and the pitch λ of punching is made larger for each round of the roll 54.

Then, by dividing the roll 54 in which the sheet steels 25B are laminated in a predetermined round number in the circumferential direction at a predetermined circumferential angle as illustrated in FIG. 8B, the stator curved part 23B having the generally arc shape in the longitudinal direction can be produced easily.

In the stator curved part 23B produced as above, each of the teeth 21 is arranged radially with respect to the curvature center P of the entire stator curved part 23B (see FIG. 5). That is, in the adjacent teeth pairs of any combination located on the stator curved part 23B, the pitch angle $\theta_\lambda$ with respect to the curvature center P can be made the same. In this case, one of the individual teeth 21 (=predetermined number N) arranged on the stator curved part 23B singularly constitutes the adjacent teeth group.

4.2: Effect of Second Embodiment

As described above, according to the linear motor 1 including the stator 2B of the second embodiment, in the stator curved part 23B, based on the pitch λ (the same pitch as that of the stator linear portion 22) of the sectional shape portions of the teeth 21 on the sheet steel 25Bc located substantially at the center in the width direction, the sheet steel 25B located on the outer peripheral side thereof has the pitch set larger, while the sheet steel 25B located on the inner peripheral side thereof has the pitch set smaller. As a result, each of the teeth 21 in the stator curved part 23B can be disposed in arrangement much closer to the radial state.

Particularly in this embodiment, the stator curved part 23B has each of the sheet steels 25B laminated by being curved having an arc shape. As a result, since the entire stator curved part 23B can be formed having the arc shape and each of the teeth 21 can be arranged more radially, variation in the thrust in the stator curved part 23B can be reduced, whereby swing performances of the mover 4 can be improved.

Particularly in this embodiment, while the sheet steel 25B is wound in the roll state, and the pitch is made larger for each round of the roll 54 to form the sectional shapes of the teeth 21, and the roll 54 is divided at the predetermined circumferential angle to produce the stator curved part 23B. As a result, the entire stator curved part 23B can be formed having the arc shape with easy and accurate curvature.

Particularly in this embodiment, the sheet steel 25B is formed by punching the sheet steel strip 52 by using the press die 51 capable of forming one sectional shape of the teeth 21. As a result, with the punching using the same press die 51, the sectional shapes of the teeth 21 can be formed on both the sheet steels 25 of the stator linear portion 22 and the stator curved part 23B. That is, both of the stator linear portion 22 and the stator curved part 23B can be produced by the same press device. Therefore, making common and simplification of the manufacturing method are improved, whereby the cost of the entire stator 2B can be reduced. The sheet steel 25A constituting the stator curved part 23A of the first embodiment can be also produced by the press device using the same press die 51.

Particularly in this embodiment, the press die 51 also forms the emboss 53 for clamping on the sheet steel 25B. As a result, alignment and fixation between the sheet steels 25B to be laminated can be performed easily and reliably.

5.1: Stator of Third Embodiment

Figure 9:
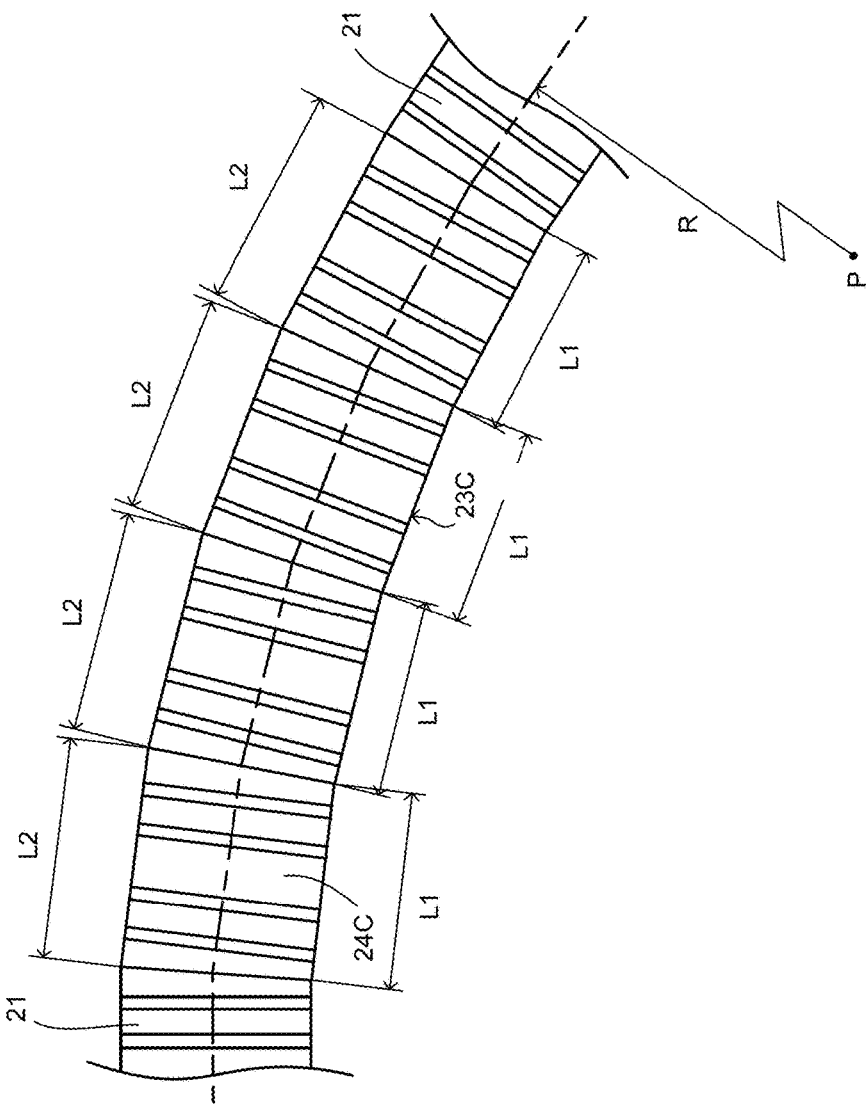
FIG. 9 is a plan view of the entire stator curved part connecting the stator dividing linear parts in the case of a third embodiment when seen from above.
Figure 10:
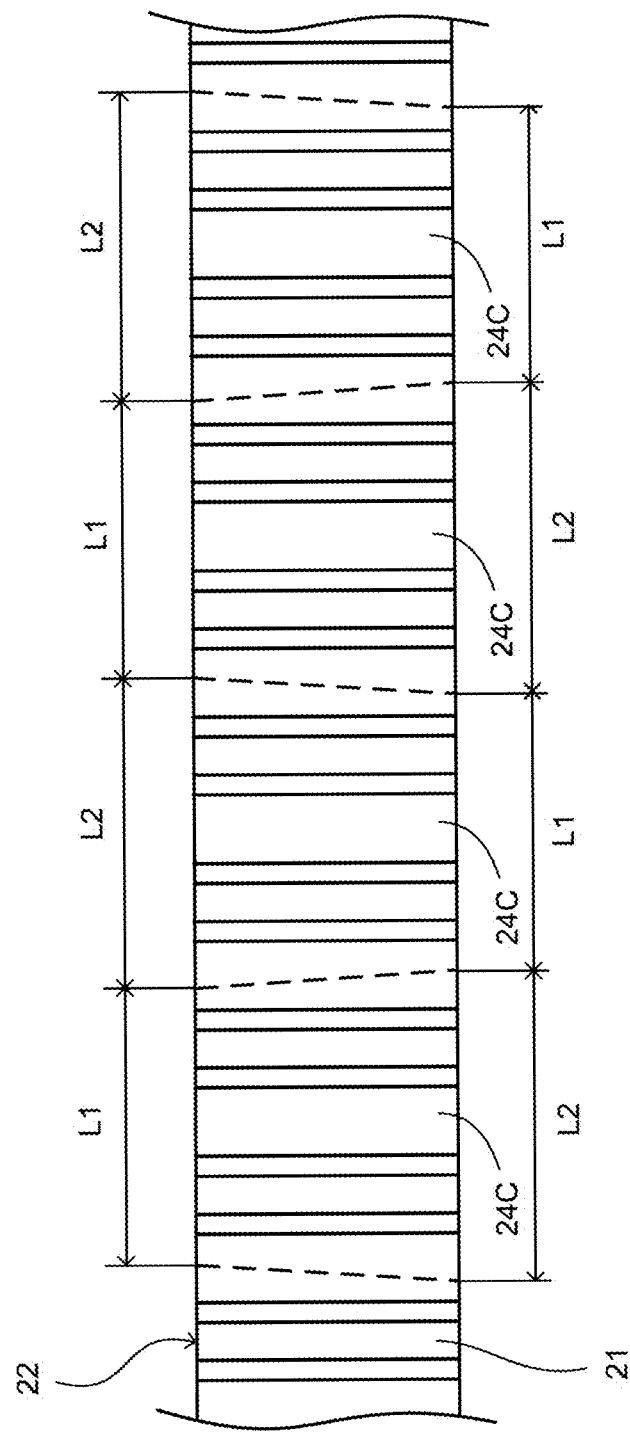
FIG. 10 is a plan view of a layout when the stator dividing linear parts are cut out from the stator linear portion in the case of the third embodiment when seen from above.

FIGS. 9 and 10 illustrate configuration of a stator 2C of a third embodiment. FIG. 9 illustrates a plan view of an entire stator curved part 23C connecting stator dividing linear parts 24C when seen from above, while FIG. 10 illustrates a plan view of a layout when the stator dividing linear part 24C is cut out from the stator linear portion 22 when seen from above. First, as illustrated in FIG. 9, the stator curved part 23C included in the stator 2C of the third embodiment is constituted having a generally arc-shaped longitudinal direction by connecting a plurality of the stator dividing linear parts 24C each having the linear longitudinal direction in the circumferential direction of the stator curved part 23C.

The respective stator dividing linear parts 24C are produced by being cut out from the stator linear portion 22 produced in advance so as to be divided in the longitudinal direction as illustrated in FIG. 10. The stator dividing linear part 24C in the illustrated example has the teeth group made up of the adjacent two (predetermined number N=2) teeth 21, respectively, and a trapezoidal shape is formed by one of edge portions in the width direction being a short side having a length L1 and the other edge portion being a long side having a length L2. The plurality of stator dividing linear parts 24C is cut out in a layout in which they are adjacent along the longitudinal direction of the stator linear portion 22 and a direction of the short side and a direction of the long side are switched alternately.

By connecting the plurality of stator dividing linear parts 24C produced as above with the short sides adjacent on the inner peripheral side, the stator curved part 23C having the generally arc shape in the longitudinal direction as illustrated in FIG. 9 is formed. In this stator curved part 23C, the individual teeth 21 are parallel with each other in the teeth group included in each of the stator dividing linear parts 24C, but they are arranged so that the outer-peripheral side pitch is larger than the inner-peripheral side pitch between the adjacent teeth groups. When seen in terms of a unit of the teeth group, each of the teeth groups is arranged radially from the curvature center P of the stator curved part 23C. By changing a ratio between the length L1 of the short side and the length L2 of the long side of each of the stator dividing linear parts 24C, the curvature (radius of curvature R) of the entire connected stator curved part 23C can be changed.

5.2: Effect of Third Embodiment

As described above, according to the linear motor 1 including the stator 2C of the third embodiment, the stator dividing linear part 24C has the teeth group made up of two (predetermined number N=2) teeth 21, and a trapezoidal shape is formed by one of edge portions in the width direction being a short side and the other edge portion being a long side. By connecting each of the stator dividing linear parts 24C so that the short sides are adjacent to each other on the inner peripheral side, the stator curved part 23C is constituted. As a result, the stator dividing linear part 24C capable of constituting the stator curved part 23C can be produced by being cut out from the normally manufactured stator linear portion 22, that is, the stator curved part 23C can be produced by being cut out from the stator linear portion 22. Therefore, the manufacturing method of the stator linear portion 22 and the stator curved part 23C can be made more common, and the cost can be reduced. Particularly, by cutting out the plurality of stator dividing linear parts 24C so as to alternately switch the direction of the short sides (long sides) while being adjacent along the longitudinal direction of the stator linear portion 22, an end material portion generated from the stator linear portion 22 can be reduced, whereby the cost can be further reduced.

Though not particularly illustrated, the number (=predetermined number N) of teeth 21 constituting each of the teeth groups may be three or more and in this case, the stator curved part 23C can be constituted with a smaller dividing number of the stator dividing linear parts 24C. However, as the number of the teeth 21 constituting each of the teeth groups is smaller (one at the least), the teeth groups can be arranged in the position relation much closer to a radial state, and the variation of the thrust between the teeth groups can be reduced, whereby swing performances of the mover 4 in the stator curved part 23C can be improved.

6.1: Fourth Embodiment

A fourth embodiment has a feature in an arrangement relation between the stator curved part 23 and the mover 4. As in a comparative example illustrated in FIG. 11, for example, on the stator curved part 23, the mover 4 (substantially the armature 42) is assumed to move on a track in an arrangement relation in which it is centered with the stator curved part 23 in the width direction only at a center position in its longitudinal direction (moving direction), that is, in an arrangement relation in which the center position of the mover 4 in the width direction matches the center position of the stator curved part 23 in the width direction. It is assumed that the mover 4 and the stator 2 have the same dimensions Ws and Wt in the respective width directions.

In the case of this comparative example, at the center position of the mover 4 in the longitudinal direction, an overlapping range in the width direction with the stator curved part 23 is ensured at the maximum, and since the teeth 21 are orthogonal to the moving direction, the thrust equal to that during running on the stator linear portion 22 can be received. However, as it goes closer to both end portions in the longitudinal direction of the mover 4, the overlapping range in the width direction with the stator curved part 23 is decreased, and a so-called skew effect by relative inclination θsk between the teeth 21 and the moving direction increases and thus, the thrust partially generated, respectively, is drastically reduced. As in this comparative example, in the case that deviation of an induced voltage along the longitudinal direction of the mover 4 (armature 42) is large, variation occurs in each phase of three-phase power supplied to the armature 42 and causes power ripple, which is not desirable in control.

In this embodiment, on the other hand, as illustrated in FIG. 12, on the stator curved part 23, the mover 4 (substantially the armature 42) moves on the track in an arrangement relation in which it is centered with the stator curved part 23 in the width direction on both end portions in its longitudinal direction (moving direction), that is, in an arrangement relation in which the center position in the width direction on the both end portions of the mover 4 matches the center position of the stator curved part 23 in the width direction. In order to realize the movement on this track, the guide rails 3 located on both sides in the width direction of the stator curved part 23 only need to regulate the moving path so that the mover 4 moves on the track in FIG. 12, for example. Specifically, a curvature of the guide rail 3 only needs to be set smaller than that of the stator curved part 23 in correspondence with a deviation ΔR from the center position in the width direction of the stator curved part 23 at the center position in the longitudinal direction of the mover 4 (not shown).

6.2: Effect of Fourth Embodiment

As described above, according to the linear motor 1 of the fourth embodiment, the guide rail 3 regulating the moving path of the mover 4 is provided. This guide rail 3 regulates the moving path such that, in the stator curved part 23, the mover 4 moves on the track in which the center position in the width direction on the both end portions of the mover 4 (substantially the armature 42) in the longitudinal direction (moving direction) matches the center position in the width direction in the stator curved part 23. As a result, on the both end portions in the longitudinal direction of the mover 4 moving on the stator curved part 23, though the induced voltage is lowered by the skew effect caused by the relative inclination θsk to the teeth 21, the overlapping range with the stator 2 in the width direction is ensured at the maximum, whereby the induced voltage can be maintained by that portion. On the other hand, on the center part in the longitudinal direction of the mover 4, though a right angle formed with the teeth 21 can maintain the induced voltage, the overlapping range with the stator 2 in the width direction is minimized, whereby the induced voltage is lowered by that portion. As a result, though the induced voltage of the entire mover 4 with respect to the stator curved part 23 is lower than that on the stator linear portion 22, a reduction balance of the induced voltage over the entire longitudinal direction can be made uniform, whereby variation in each phase of the three-phase power and generation of power ripple can be suppressed, and control performances can be improved.

7.1: Stator of Fifth Embodiment

Figure 14A:
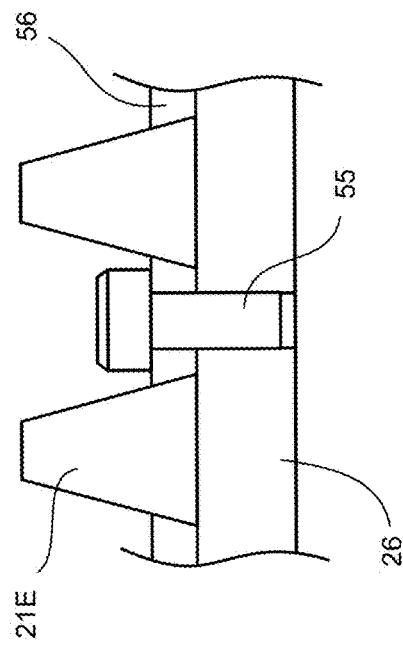
FIG. 14A is a side sectional view illustrating an example of a fixing structure in the case in which the columnar teeth and the substrate part are both constituted by electromagnetic steels in the fifth embodiment.
Figure 14B:
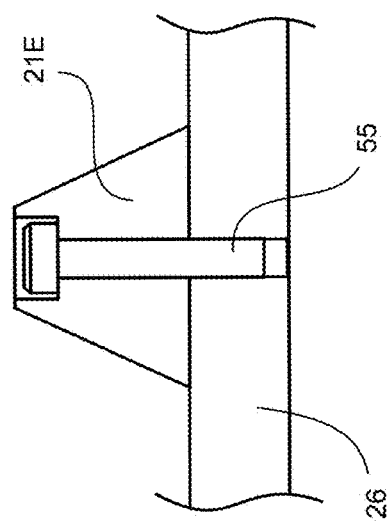
FIG. 14B is a side sectional view illustrating another example of the fixing structure in the case in which the columnar teeth and the substrate part are both constituted by electromagnetic steels in the fifth embodiment.

FIGS. 13 to 15 illustrate configuration of a stator 2E of a fifth embodiment. FIG. 13 illustrates a perspective view of a stator linear portion 22E in which columnar teeth 21 formed separately on a substrate part 26 are arranged in plural when seen from diagonally above, FIGS. 14A and 14B illustrate side sectional views illustrating an example of a fixing structure in which both the substrate part 26 and the columnar teeth 21E are constituted by the electromagnetic steel, and FIGS. 15A and 15B illustrate side sectional views illustrating an example of the fixing structure in which only the columnar teeth 21E are constituted by the electromagnetic steel. First, as illustrated in FIG. 13, the stator 2E has the flat-plate shaped substrate part 26 elongated in the longitudinal direction and a plurality of the columnar teeth 21E formed separately and having the same length as the width direction of this substrate part 26. That is, each of the teeth is individually formed having a columnar shape with an appropriate sectional shape (a trapezoidal shape in the illustrated example), and the plurality of columnar teeth 21E is fixed in parallel arrangement along the longitudinal direction on an upper plane of the substrate part 26.

Basically, all the columnar teeth 21E only need to be arranged so that the pitch λ at the center position in the width direction of the substrate part 26 is constant in a posture toward the width direction orthogonal to the longitudinal direction of the substrate part 26, respectively. By following such an arrangement rule, the columnar teeth 21E are arranged in parallel at the certain pitch λ in the stator linear portion 22E as illustrated in FIG. 13. Though not particularly shown, each of the columnar teeth 21E is arranged radially from the curvature center P at the certain pitch angle $θ_λ$, in the stator curved part 23. That is, most of the manufacturing process of arranging and fixing the columnar teeth 21E on the substrate part 26 on the basis of the arrangement rule can be made common between the stator linear portion 22E and the stator curved part 23 and simplified, whereby the cost of the entire stator 2E can be reduced.

Here, if at least only the columnar teeth 21E are constituted by the electromagnetic steel, the thrust can be generated upon receipt of the moving magnetic field of the mover 4 (armature 42). In the case that each of the columnar teeth 21E and the substrate part 26 are both constituted by the electromagnetic steel, as illustrated in FIGS. 14A and 14B, for example, a structure in which the columnar teeth 21E are fixed to the substrate part 26 by using a bolt 55 is desirable. In the structure illustrated in FIG. 14A, an upper side portion of each of the columnar teeth 21E formed having a trapezoidal section is protruded, while a bottom side portion is covered by a pressing plate 56, and the pressing plate 56 is fixed to the substrate part 26 by the bolt 55. In the structure illustrated in FIG. 14B, the columnar teeth 21E are fixed to the substrate part 26 by directly penetrating the bolt 55 from the upper side portion perpendicularly.

In the case that only each of the columnar teeth 21E is constituted by the electromagnetic steel and the substrate part 26 is constituted by a material other than the electromagnetic steel, a structure of fixing the columnar teeth 21E to the substrate part 26 by joining with an assembled joint as illustrated in FIGS. 15A and 15B, for example, is desirable. In the structure illustrated in FIG. 15A, the columnar teeth 21E each formed having a trapezoidal section are fitted in and fixed to a groove 57 formed in the substrate part 26 by using their bottom side portions as joints. In the structure illustrated in FIG. 15B, the columnar teeth 21E are fixed by fitting a joint 58 formed on their bottom sides in a groove 59 of the substrate part 26.

7.2: Effect of Fifth Embodiment

As described above, according to the linear motor 1 including the stator 2E of the fifth embodiment, the stator 2E is constituted by arranging a plurality of the columnar teeth 21E each having a columnar shape on the substrate part 26. As a result, the teeth 21E can be disposed both on the stator linear portion 22E and the stator curved part 23 with an easy and appropriate arrangement by a common method, whereby the cost of the entire stator 2E can be reduced.

The term "perpendicular (orthogonal)" in the explanation is not perpendicularity in a strict sense. That is, the term "perpendicular (orthogonal)" means "substantially perpendicular (orthogonal)" which allows tolerances and errors in design and manufacture.

The term "parallel" in the explanation is not parallelism in a strict meaning. That is, the term "parallel" means "substantially parallel" which allows tolerances and errors in design and manufacture.

The term "equal (same)" in the explanation does not mean it in a strict sense. That is, the term "equal (same)" means "substantially equal (same)" which allows tolerances and errors in design and manufacture.

The term "linear" in the explanation does not mean it in a strict sense. That is, the term "linear" means "substantially linear" which allows tolerances and errors in design and manufacture.

The term "arc shaped" in the explanation is not a strict meaning. That is, the term "arc shaped" means "substantially arc shaped" which allows tolerances and errors in design and manufacture. Even a curve which is curved in a complicated manner in general can be partially regarded as a collection of arc-shaped portions with almost the same radius of curvature. Thus, the stator 2 having the complicated curved longitudinal direction can be regarded as a combination of a plurality of the stator curved parts 23 each having an arc shape with different radius of curvature.

Other than those described above, methods according to the embodiments and each variation may be used in combination as appropriate.

Though not exemplified respectively, the embodiments and each variation are put into practice with various changes within a range not departing from the gist thereof.

What is claimed is:

1. A linear motor, comprising:
    a stator comprising a stator curved part having an arc shape in a longitudinal direction;
    a mover positioned to face the stator and configured to move in the longitudinal direction of the stator; and
    a plurality of teeth positioned in parallel along the longitudinal direction such that a pitch of the teeth at an outer peripheral side is larger than a pitch of the teeth at an inner peripheral side on the stator curved part,
    wherein the stator curved part comprises a plurality of stator dividing linear parts formed such that each of the stator dividing linear parts has a linear shape in the longitudinal direction and that the stator dividing linear parts are connected to each other in a circumferential direction to form the arc shape.

2. The linear motor according to claim 1, wherein the teeth are positioned radially from a curvature center of the stator curved part in the stator curved part.

3. The linear motor according to claim 2, wherein the stator comprises a plurality of sheet steels laminated in a width direction orthogonal to the longitudinal direction.

4. The linear motor according to claim 3, wherein the stator curved part is formed such that the sheet steels have portions of the teeth having pitches that become larger on the outer peripheral side and smaller on the inner peripheral side than a pitch approximately at a center of the width direction.

5. The linear motor according to claim 4, wherein each of the sheet steels of the stator dividing linear part has a reference position such that the pitches of the portions of the teeth become larger as the portions of the teeth become farther away from the reference position in the longitudinal direction.

6. The linear motor according to claim 1, wherein the stator curved part comprises a predetermined number N of the teeth positioned parallel with one another where N is an integer of 1≤N, wherein the stator dividing linear part is formed in a trapezoidal shape in which one of edge portions in a width direction orthogonal to the longitudinal direction is a short side and another edge portion is a long side, and the stator dividing linear parts are connected such that the short sides are disposed adjacent to each other on the inner peripheral side of the stator curved part.

7. The linear motor according to claim 6, wherein the stator dividing linear parts are positioned radially from a curvature center of the stator curved part.

8. The linear motor according to claim 1, further comprising:
    a guide rail structure configured to regulate a moving path of the mover such that in the stator curved part, the mover moves on a track in which a center position in a width direction orthogonal to the longitudinal direction on both end portions of the mover in the longitudinal direction approximately matches the center position in the width direction in the stator curved part.

9. The linear motor according to claim 1, wherein the stator comprises a substrate part, and the plurality of teeth each having a columnar shape and formed as separate parts on the substrate part.

10. A linear motor manufacturing method comprising:
laminating a plurality of sheet steels each having portions of a plurality of teeth formed in a longitudinal direction such that the plurality of sheet steels is laminated in a width direction orthogonal to the longitudinal direction and forms a stator having a stator curved part in an arc shape in the longitudinal direction and the plurality of teeth positioned parallel along the longitudinal direction; and
positioning a mover to face the stator such that the mover is configured to move in the longitudinal direction of the stator,
wherein the plurality of teeth has a pitch on an outer peripheral side that is larger than a pitch of the teeth on the sheet steel on an inner peripheral side, and the stator curved part comprises a plurality of stator dividing linear parts formed such that each of the stator dividing linear parts has a linear shape in the longitudinal direction and that the stator dividing linear parts are connected to each other in a circumferential direction to form the arc shape.

11. The linear motor manufacturing method according to claim 10, wherein the laminating comprises forming the stator curved part such that each of the sheet steels of the stator dividing linear part has a reference position and that the pitches of the portions of the teeth become larger as the portions of the teeth become farther away from the reference position in the longitudinal direction.

12. The linear motor manufacturing method according to claim 10, wherein the laminating comprises forming the stator curved part such that the stator dividing linear part is formed in a trapezoidal shape in which one of edge portions in a width direction orthogonal to the longitudinal direction is a short side and another edge portion is a long side, and that the stator dividing linear parts are connected such that the short sides are disposed adjacent to each other on the inner peripheral side of the stator curved part.

13. The linear motor manufacturing method according to claim 10, further comprising forming the sheet steels by punching a sheet steel strip by a press die configured to form a sectional shape of the teeth.

14. The linear motor manufacturing method according to claim 13, wherein the forming the sheet steels comprises forming an emboss for clamping by the press die.

15. The linear motor according to claim 1, wherein the stator comprises a plurality of sheet steels laminated in a width direction orthogonal to the longitudinal direction.

16. The linear motor according to claim 15, wherein the stator curved part is formed such that the sheet steels have portions of the teeth having pitches that become larger on the outer peripheral side and smaller on the inner peripheral side than a pitch approximately at a center of the width direction.

17. The linear motor according to claim 16, wherein each of the sheet steels of the stator dividing linear part has a reference position such that the pitches of the portions of the teeth become larger as the portions of the teeth become farther away from the reference position in the longitudinal direction.

18. The linear motor according to claim 2, wherein the stator curved part comprises a predetermined number N of the teeth positioned parallel with one another where N is an integer of $1 \leq N$, the stator dividing linear part is formed in a trapezoidal shape in which one of edge portions in a width direction orthogonal to the longitudinal direction is a short side and another edge portion is a long side, and the stator dividing linear parts are connected such that the short sides are disposed adjacent to each other on the inner peripheral side of the stator curved part.

19. The linear motor according to claim 18, wherein the plurality of stator dividing linear parts is positioned radially from a curvature center of the stator curved part.

20. The linear motor according to claim 2, further comprising:
a guide rail structure configured to regulate a moving path of the mover such that in the stator curved part, the mover moves on a track in which a center position in a width direction orthogonal to the longitudinal direction on both end portions of the mover in the longitudinal direction approximately matches the center position in the width direction in the stator curved part.

* * * * *

UNITED STATES PATENT AND TRADEMARK OFFICE
CERTIFICATE OF CORRECTION

PATENT NO. : 10,355,574 B2  
APPLICATION NO. : 15/172367  
DATED : July 16, 2019  
INVENTOR(S) : Shogo Makino et al.

Page 1 of 1

It is certified that error appears in the above-identified patent and that said Letters Patent is hereby corrected as shown below:

On the Title Page

Item (73), the Assignee has been omitted. Item (73) should read:  
--(73) Assignee: KABUSHIKI KAISHA YASKAWA DENKI, Kitakyushu-shi (JP)--

Signed and Sealed this  
Twenty-eighth Day of April, 2020

Andrei Iancu  
*Director of the United States Patent and Trademark Office*